No. 785,635. PATENTED MAR. 21, 1905.
J. PETERSON.
INSTRUMENT FOR SHAKING DOWN THE MERCURIAL COLUMNS IN CLINICAL THERMOMETERS.
APPLICATION FILED JULY 24, 1903.
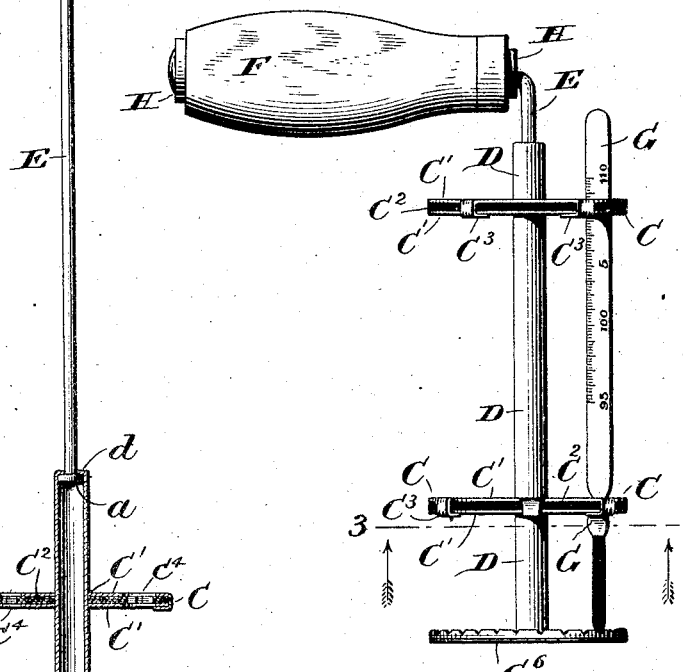
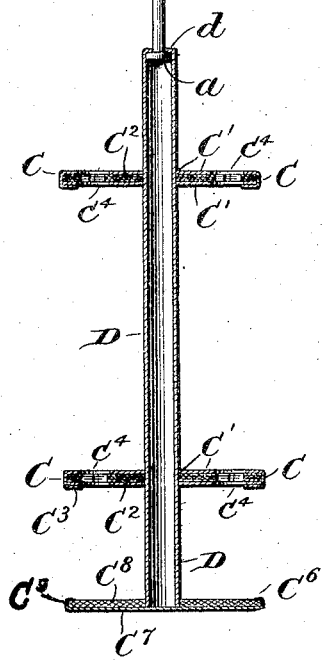
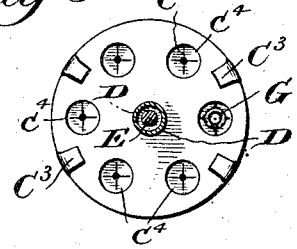

No. 785,635. Patented March 21, 1905.

UNITED STATES PATENT OFFICE.

JENS PETERSON, OF TACOMA, WASHINGTON.

INSTRUMENT FOR SHAKING DOWN THE MERCURIAL COLUMNS IN CLINICAL THERMOMETERS.

SPECIFICATION forming part of Letters Patent No. 785,635, dated March 21, 1905.

Application filed July 24, 1903. Serial No. 166,908.

*To all whom it may concern:*

Be it known that I, JENS PETERSON, a citizen of the United States, residing at Tacoma, in the county of Pierce and State of Washington, have invented certain new and useful Improvements in Instruments for Shaking Down the Mercurial Columns of Clinical Thermometers; and I do hereby declare the following to be a full, clear, and exact description of the invention, such as will enable others skilled in the art to which it appertains to make and use the same.

This invention relates to improvements in instruments for shaking down the mercurial columns of clinical thermometers.

The object of the present invention is the provision of an instrument of the character referred to by the use of which the mercurial columns of clinical thermometers after the latter have been employed for obtaining the temperature of patients may be restored to their normal or contracted condition without the necessity of jarring or jolting the thermometers, as is commonly the case.

A further object of the present invention is to provide an instrument of the class stated which is so constructed as to accomplish the desired results through the medium of a whirling action, thus inducing the restoration of the mercury to its normal condition through the medium of centrifugal force.

With these general objects in view and others which will appear as the nature of the improvements is better understood the invention consists, substantially, in the novel construction, combination, and arrangement of parts, as will be hereinafter fully described, illustrated in the accompanying drawings, and pointed out in the appended claims.

In the drawings, Figure 1 is a side elevation of an instrument constructed in accordance with the present invention and illustrated in closed position, a thermometer being carried thereby. Fig. 2 is a similar view, partly in section, the instrument being in the distended form which it occupies when the same is being used. Fig. 3 is a sectional plan view on the line 3 3, Fig. 1.

Referring to the drawings, D designates a tubular shank, which shank is preferably circular in cross-section and is provided at its upper end with an inturned flange $d$, as clearly shown in Fig. 2. Slidably mounted within the shank D is an elongated stem E, the upper end of which is provided with a handle F, connected to the stem E and secured thereon through the medium of washers H. The inner end of the stem E is provided with a head $a$, the diameter of the latter being substantially the same as the internal diameter or bore of the shank D, and it will thus be seen that when the stem E is moved to its outer or distended position the head $a$ will contact with the flange $d$, and thus limit the outward movement of said stem.

Arranged upon the tubular stem D and spaced at suitable intervals thereon is a series of holding-disks C. Each of these disks comprises a pair of clamping-plates C', between which is interposed a yielding pad $C^2$, the latter being preferably of rubber, and in order that the plates C' of each of the disks C may be firmly held together and in locked engagement with the pad $C^2$ one of the plates C' of each of the disks is provided with peripheral ears $C^3$, which are bent around the edges of the pads and into engagement with the other plate C'. It will thus be seen that through the medium of the ears $C^3$ the plates of each disk are firmly held together and securely bind the pads $C^2$ thereof. The plates C' of the disk C are perforated at suitable points, as at $C^4$, to permit the passage of the thermometers through the disks, and in order that the thermometers may be properly held in the perforations $C^4$ the pads $C^2$, which extend over said perforations, are slitted, as at $C^5$, thus permitting the passage of the thermometers, but providing adherent points for engaging the sides of the thermometers, and thus maintain the latter in frictional engagement with the respective pads.

Arranged at the lower end of the tubular stem D is a supporting-disk $C^6$, which disk comprises a plate $C^7$, upon which is mounted a pad $C^8$, and it will be observed that this pad is not provided with the perforations similar to the other disks, but presents an unbroken surface upon which the points of the thermometers are adapted to rest when inserted in the holding-disks.

In the use of the herein-described invention the normal position thereof is illustrated in Fig. 1, wherein the handle F, carried by the stem E, is closed upon the tubular shank D. The thermometers G are inserted according to the number thereof in the perforations $C^4$ of the holding-disks C, the points of the thermometers resting upon the pad $C^8$ of the supporting-disk $C^6$. The handle F being grasped, a whirling motion is imparted to the shank D, and consequently the shank, together with the disks carried thereby, will be caused to slide upon the stem E through centrifugal force until the flange $d$ contacts with the head $a$. This whirling motion being continued, it is apparent that the mercurial columns will be forced to their normal or contracted positions, it being remembered that the points of the thermometers rest upon the supporting-disk $C^6$. It will thus be seen that the shank D and the disks C and $C^6$ constitute a carrier for the thermometers, which carrier is slidably mounted upon the handle as an entirety. In positioning the thermometers in the respective perforations the slitted portions of the respective pads frictionally engage the sides of the thermometers, and consequently the latter are firmly held within the respective disks and prevented being displaced therefrom. By the use of the invention the jarring and jolting of the thermometers which is commonly employed for restoring their mercurial columns to their normal positions is entirely eliminated and the desired results are accomplished wholly through centrifugal force and in an expeditious and easy manner. Moreover, a series of thermometers may be simultaneously acted upon, and the invention therefore is highly adapted for use in hospitals and dispensaries, wherein it is necessary to simultaneously restore a series of thermometers to their normal conditions after the taking of temperatures of a series of patients.

While the form of the invention herein shown and described is what is believed to be a preferable embodiment thereof, it will of course be understood that the invention is susceptible of various changes in the form, proportion, and minor details of construction, and the right is therefore reserved to vary or modify the invention as falls within the spirit and scope thereof.

Having thus described my invention, what is claimed as new, and desired to be secured by Letters Patent, is—

1. An instrument of the class described, comprising a stem, and a carrier slidably mounted thereon and comprising a tubular shank incasing said stem, and holding-disks carried by said tubular shank for receiving the thermometers.

2. An instrument of the class described, comprising a stem, and a carrier slidably mounted thereon and comprising a tubular shank incasing the stem, holding-disks carried by said shank for receiving the thermometers, and means for limiting the movement of the carrier upon the stem.

3. An instrument of the class described, comprising a handle, a stem connected thereto, a tubular shank incasing said stem, holding-disks carried by said shank and adapted to receive the thermometers, and a supporting-disk also carried by said shank and upon which the points of the thermometers are adapted to rest.

4. An instrument of the class described, comprising a handle, a stem connected thereto, a tubular shank incasing said stem, holding-disks carried by said shank and adapted to receive the thermometers, a supporting-disk also carried by said shank and upon which the points of the thermometers are adapted to rest, and means carried by said holding-disks for frictionally engaging the thermometers to retain the latter therein.

5. An instrument of the class described, comprising a handle, a stem connected thereto, a tubular shank incasing said stem, holding-disks carried by said shank and each comprising a pair of perforated plates and a pad interposed therebetween, and a supporting-disk carried by said shank and upon which the points of the thermometers are adapted to rest.

6. An instrument of the class described, comprising a handle, a stem connected thereto, a head carried by said stem, a tubular shank incasing said stem and provided with a flange adapted to coöperate with the head of the stem for limiting movement of the tubular shank on the latter, a series of holding-disks carried by said shank for the reception of the thermometers, and a supporting-disk also carried by said shank and upon which the points of the thermometers are adapted to rest.

7. An instrument of the class described, comprising a handle, a stem connected thereto, a shank slidably mounted upon said stem, holding-disks carried by said shank and adapted to receive the thermometers, a supporting-disk also carried by said shank, and a pad carried by said supporting-disk and upon which the points of the thermometers are adapted to rest.

8. An instrument of the class described, comprising a handle, a stem connected thereto, a shank slidably mounted upon said stem, means for limiting the movement of said shank upon said stem, perforated holding-disks carried by said shank and adapted to receive the thermometers, means for engaging the thermometers to retain the same in said disks, and a supporting-disk also carried by said shank and upon which the points of the thermometers are adapted to rest.

JENS PETERSON.

Witnesses:
A. A. KNIGHT,
W. W. WINGARD.